(12) United States Patent
Simpson et al.

(10) Patent No.: US 8,122,787 B2
(45) Date of Patent: Feb. 28, 2012

(54) TRANSMISSION GEAR TRAIN BAFFLE

(75) Inventors: Sean Simpson, Troy, MI (US);
Jonathan Hottenstein, Royal Oak, MI (US); Gregory Chessky, Walled Lake, MI (US); Pete R. Garcia, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 258 days.

(21) Appl. No.: 12/408,196

(22) Filed: Mar. 20, 2009

(65) Prior Publication Data
US 2010/0236357 A1    Sep. 23, 2010

(51) Int. Cl.
*F16H 57/02* (2006.01)
(52) U.S. Cl. .................................... 74/606 R
(58) Field of Classification Search ............... 74/606 R; 184/6.12, 6.27, 11.1, 13.1
See application file for complete search history.

(56) References Cited

U.S. PATENT DOCUMENTS

| 5,505,112 | A | * | 4/1996 | Gee | 74/606 R |
| 2006/0048600 | A1 | * | 3/2006 | Taguchi et al. | 74/607 |

FOREIGN PATENT DOCUMENTS

| JP | 2005147183 A | * | 6/2005 |
| JP | 2005308044 A | * | 11/2005 |

* cited by examiner

*Primary Examiner* — Vicky Johnson

(57) ABSTRACT

A transmission includes a transmission case, a rotatable component disposed within the transmission case, and a sump disposed below the rotatable component for storing a hydraulic fluid. A gear train baffle is disposed between the rotatable component and the transmission case. The baffle includes an outer surface, an inner surface defining a cavity that substantially encircles the rotatable component, and a plurality of tabs disposed radially outward from the outer surface. The plurality of tabs are in contact with the transmission case to prevent the baffle from rotating. A plurality of openings are located at a bottom portion of the baffle. The plurality of openings extend through the baffle between the inner surface and the outer surface. The hydraulic fluid from the rotatable component collects on the inner surface of the baffle and is directed out of the cavity through the plurality of openings into the sump.

21 Claims, 4 Drawing Sheets

TRANSMISSION GEAR TRAIN BAFFLE

FIELD

The present disclosure relates to a transmission gear train baffle that reduces the clearance between a rotating component in a gear train and a transmission case.

BACKGROUND

The statements in this section merely provide background information related to the present disclosure and may or may not constitute prior art.

Powertrains in motor vehicles require lubrication and cooling using a hydraulic fluid to continuously operate. More specifically, the engine and especially the automatic transmission require lubricating and hydraulic fluids or oils to maintain their operation and extend their useful life. The hydraulic fluid is communicated throughout the transmission via hydraulic passages and controls. For example, a typical rear wheel drive planetary transmission architecture contains two 'sections': a barrel section containing the gear train assembly and a sump section located below the gear train containing hydraulic controls. Transmissions use oil pans to collect and store oil as a source of oil for an oil pump that distributes it under pressure throughout the transmission. The pans may be wet sump or dry sump, the former storing a larger volume of oil than the latter.

The barrel section of the transmission typically has a large clearance between the rotating components and the transmission case or housing. This large clearance is due in part to the nature of aluminum casting draft and various transmission architectures chosen that define the shape of the transmission case. A large clearance between the rotating components and the transmission case is particularly unwanted as vehicle performance envelopes increase; maneuver volumes force hydraulic fluid into rotating components through fluid transfers designed to drain the oil from the gear train. Accordingly, excess hydraulic fluid collects on the rotating components. As the components rotate, centrifugal force throws this oil from the parts. The thrown hydraulic fluid, being uncontrolled, causes splash from contact with the oil pan (or controls) and with hydraulic fluid already in the collection volume of the oil pan. The hydraulic fluid splashing back onto the rotating assembly induces hydraulic drag from the fluid impact. In addition, the wind created by the rotating gear train creates additional splash by contacting the oil in the collection volume of the oil pan.

The loss associated with wind related splash is known as windage loss while that of thrown oil is referred to as oil impact loss. The consequence of too much hydraulic fluid on rotating is more than mere friction. Hydraulic fluid on the rotating parts has a mass which must be accelerated during engine acceleration which acts as a loss on efficiency.

In addition, the splashing hydraulic fluid leads to aeration of the hydraulic fluid. High proportions of dissolved air in the hydraulic fluid can in turn lead to pump cavitation and excessive softness in hydraulic-actuator force-versus-displacement characteristics. The dissolved air can also reduce the effectiveness of hydraulic fluid lubrication and cooling properties. Accordingly, there is a need in the art for a device for reducing the clearance between the rotating components in the transmission and the transmission case wall in order to reduce hydraulic fluid splash in order to reduce drag losses and aeration.

SUMMARY

A transmission is provided having a transmission case, a rotatable component disposed within the transmission case, and a sump disposed below the rotatable component for storing a hydraulic fluid. A gear train baffle is disposed between the rotatable component and the transmission case. The baffle includes an outer surface, an inner surface defining a cavity that substantially encircles the rotatable component, and a plurality of tabs disposed radially outward from the outer surface. The plurality of tabs are in contact with the transmission case to prevent the baffle from rotating. A plurality of openings are located at a bottom portion of the baffle. The plurality of openings extend through the baffle between the inner surface and the outer surface. The hydraulic fluid from the rotatable component collects on the inner surface of the baffle and is directed out of the cavity through the plurality of openings into the sump.

In one example of the present disclosure, the baffle includes a front end and a back end disposed axially opposite the front end, and the plurality of tabs are located proximate the front end.

In another example of the present disclosure, the plurality of openings include three openings, and a first of the three openings is larger than a second and third of the three openings.

In yet another example of the present disclosure, the first opening is located between the second and third openings and is disposed axially along the bottom portion of the baffle.

In yet another example of the present disclosure, the transmission case includes a lower wall having a plurality of case drain holes that communicate with the sump, and the plurality of openings in the baffle are in communication with the case drain holes of the lower wall.

In yet another example of the present disclosure, the inner surface of the baffle is solid along a top portion of the baffle in order to collect the hydraulic fluid and prevent the hydraulic fluid from exiting the baffle via the top portion.

In yet another example of the present disclosure, the transmission case includes a plurality of bolt hole bosses, and the plurality of tabs of the baffle are disposed between the plurality of bolt hole bosses.

In yet another example of the present disclosure, the rotating component is a rotating shell surrounding at least one of a gear set, shaft, or torque transmitting device, the rotating shell having a plurality of slots that allow for communication of the hydraulic fluid therethrough.

In yet another example of the present disclosure, the transmission case includes a front end located proximate a hydrodynamic fluid drive device and the baffle is located proximate the front end of the transmission case.

In yet another example of the present disclosure, the baffle is directly radially adjacent the transmission case and the rotating component with no components between the baffle and the rotating component and the baffle and the transmission case.

In yet another example of the present disclosure, the baffle is disposed radially outward of the largest rotating component within the transmission.

Further objects, examples and advantages of the present disclosure will become apparent by reference to the following description and appended drawings wherein like reference numbers refer to the same component, element or feature.

DRAWINGS

The drawings described herein are for illustration purposes only and are not intended to limit the scope of the present disclosure in any way;

Figure 4:
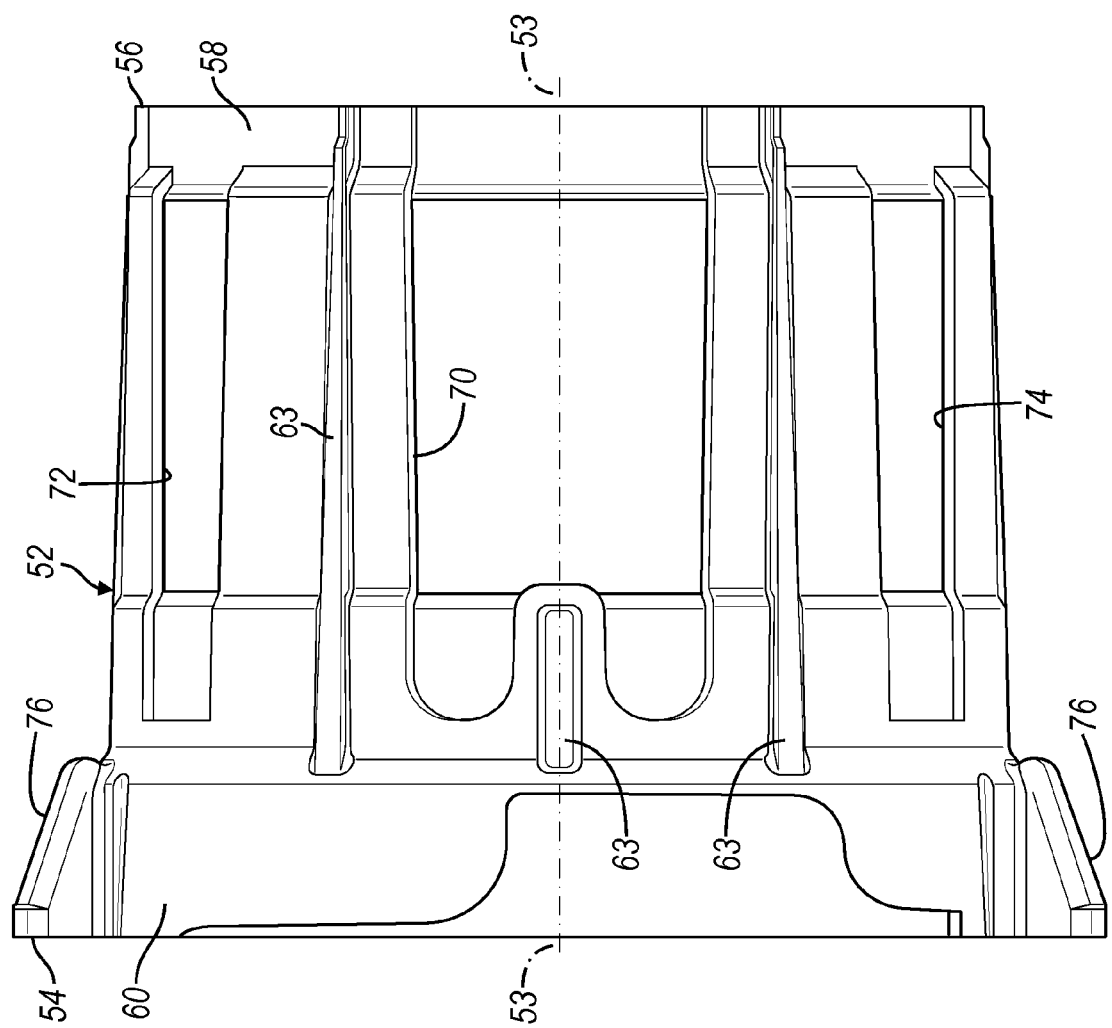

FIG. 4 a bottom view of the gear train baffle of the present disclosure.

DETAILED DESCRIPTION

Figure 1:
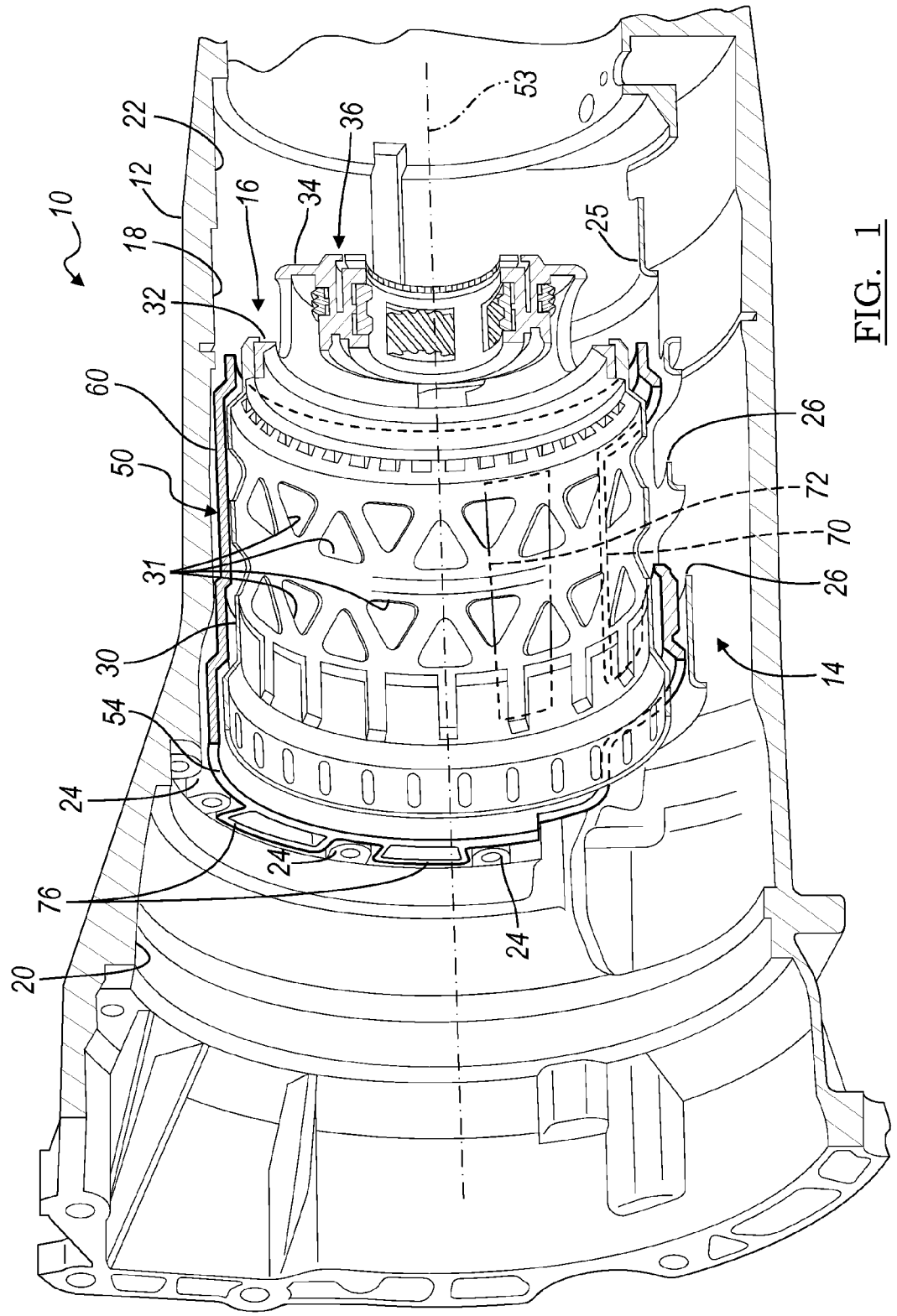
FIG. 1 is a partial, isometric cross-sectional view of an exemplary automatic transmission having a gear train baffle according to the principles of the present disclosure.

With reference to FIG. 1, a portion of an exemplary automatic transmission is generally indicated by reference number 10. The transmission 10 is preferably a multiple-speed, automatic shifting power transmission. The transmission 10 is preferably a rear wheel drive transmission, though it should be appreciated that the transmission 10 may be a front wheel drive transmission without departing from the scope of the present disclosure. The transmission 10 generally includes a transmission case 12 that houses a sump section 14 and a gear train section 16.

The transmission case 12 is preferably a cast, metal housing which encloses and protects the various components of the transmission 10. The transmission case 12 includes a variety of apertures, passageways, shoulders and flanges which position and support these components. More specifically, the transmission case 12 defines an axially extending central cavity 18 that includes a front portion 20 and a rear portion 22. The front portion 20 is preferably sized to enclose a hydrodynamic fluid drive device (not shown), such as a conventional torque converter or fluid coupling device. The rear portion 20 extends axially away from the front portion 20. The rear portion 22 is preferably sized to enclose the gear train section 16, as will be described in greater detail below.

The transmission case 12 defines a plurality of bolt hole bosses 24 that extend along an inner circumference of the transmission case 12 between the front portion 20 and the rear portion 22. The bolt hole bosses 24, only three of which are shown, extend radially inward into the central cavity 18. It should be appreciated that any number of bolt hole bosses 24 may be employed without departing from the scope of the present disclosure.

The transmission case 12 also includes a lower case wall 25 that separates the gear train section 16 from the sump section 14. The lower case wall 25 includes a plurality of case drain holes or windows 26 that communicate between the gear train section 16 and the sump section 14. The plurality of case drain holes 26 allow for the communication of hydraulic fluid from the gear train section 16 to the sump section 14, as will be described in greater detail below.

The sump section 14 is located underneath the gear train section 16 and generally includes a dry or wet sump, not specifically shown, as well as various hydraulic controls and valves. The sump is used to store the hydraulic fluid that is distributed throughout the transmission 10.

The gear train section 16, as noted above, includes rotating components operable to transmit torque from an engine of the motor vehicle to a final drive train in a plurality of forward and reverse gear ratios, as is known in the art. These components are not shown specifically in FIG. 1 in order to provide clarity to the figure. However, an exemplary rotating component, indicated by reference number 30, is shown. The rotating component 30 is, in the example provided, an input shell that encircles other rotating components, such as planetary gears, rotating clutches or brakes, and/or rotating shafts or other members. The rotating component 30 is the largest rotating element (i.e. having the largest radial dimension) within the transmission 10. The rotating component 30 includes a plurality of slots 31 that allow hydraulic fluid to communicate through the rotating component 30. In the example provided, the rotating component 30 is coupled to a rotating member 32. The rotating member 32 is in turn coupled to a carrier 34 of a planetary gear set 36. However, it should be appreciated that the rotating member 30 may be configured in any number of ways without departing from the scope of the present disclosure.

The transmission 10 includes a baffle 50 according to the principles of the present disclosure. The baffle 50 is used to reduce the clearance between the largest rotating component within the transmission 10 (the rotating component 30 in the example provided) and the transmission case 12.

Figure 2:
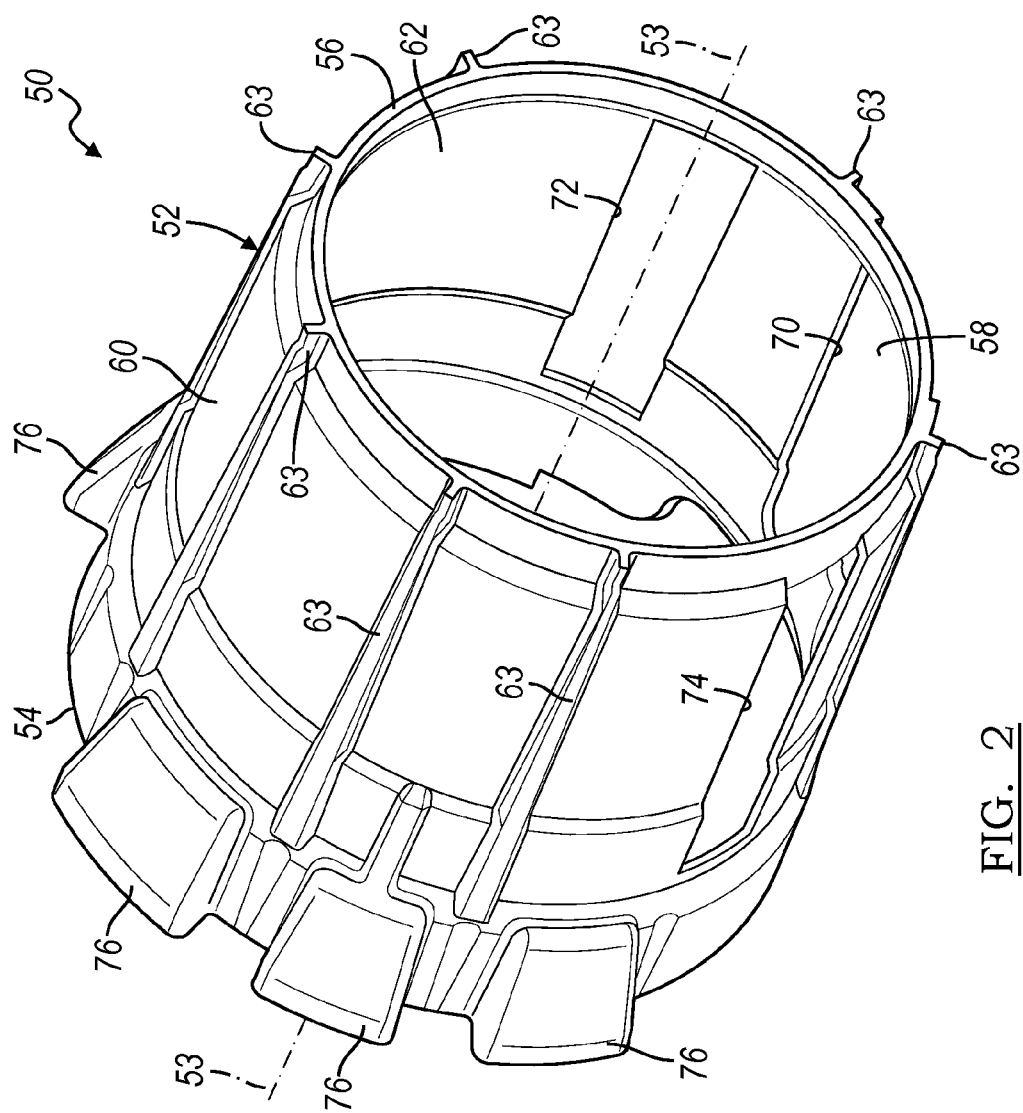
FIG. 2 is a rear isometric view of an embodiment of a gear train baffle according to the present disclosure.
Figure 3:
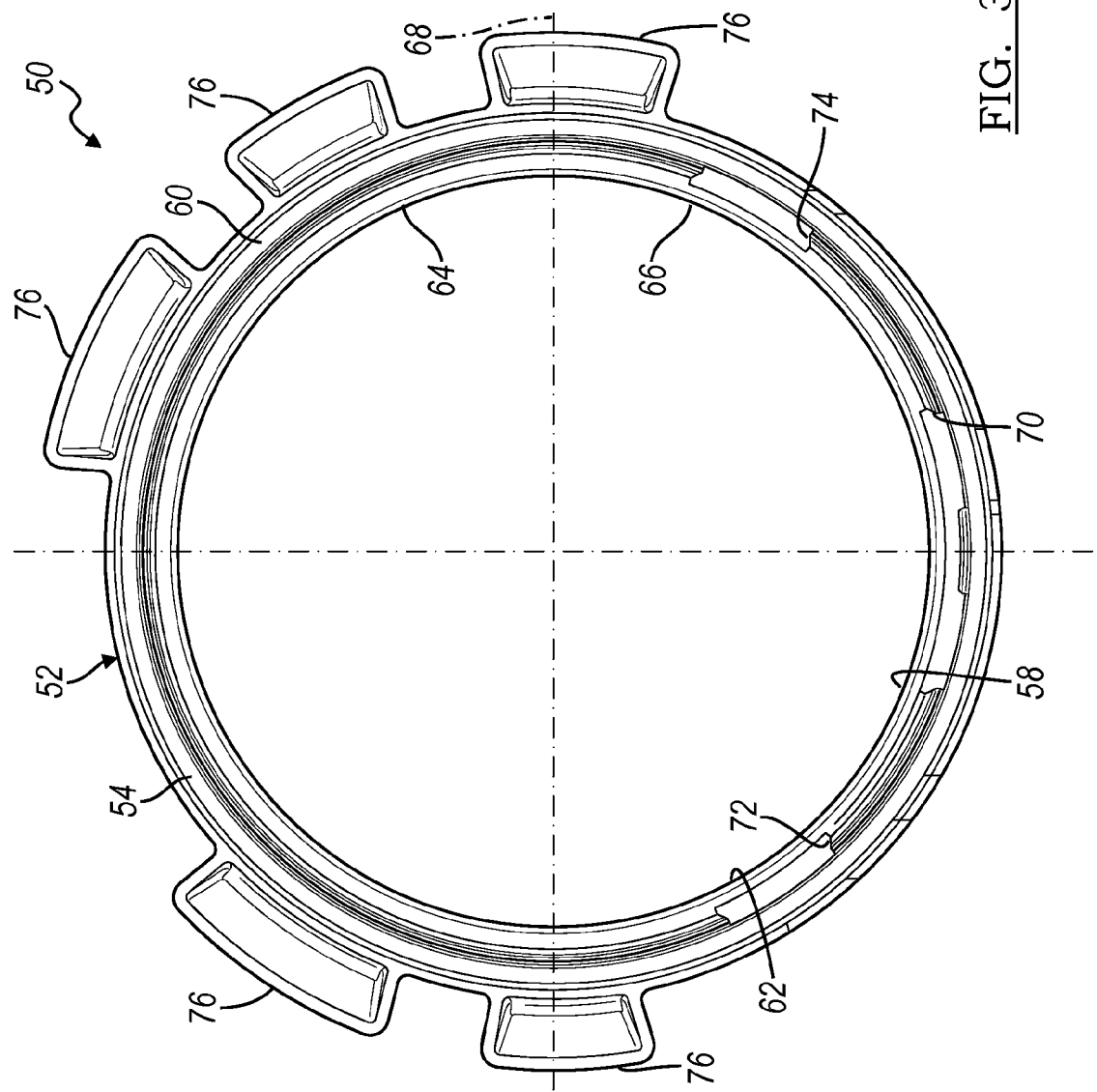
FIG. 3 is a front view of the gear train baffle of the present disclosure.

Turning now to FIGS. 2-4, the baffle 50 will be described in detail. The baffle 50 is generally cylindrical and includes a barrel portion 52 that defines a longitudinal axis 53 through a center of the barrel portion 52. The barrel portion 52 includes a first end 54, a second end 56 located longitudinally opposite the first end 54, an inner surface 58, and an outer surface 60. Both the first end 54 and the second end 56 are open and communicate with a cavity 62 defined by the inner surface 58 of the barrel portion 52. The outer surface 60 includes a plurality of axially running gussets or reinforcement ridges 63 that function to strengthen the barrel portion 52. The barrel portion 52 is stepped (i.e. the outer diameter of the barrel portion 52 decreases axially from the first end 54 to the second end 56) and approximately matches the contours of the transmission case 12.

With specific reference to FIG. 3, the barrel portion 52 includes a top portion 64 and a bottom portion 66. The top portion 64 is defined as the area of the barrel portion 52 located above a horizontal plane, indicated by reference number 68, which bisects the barrel portion 52. The bottom portion 66 is defined as the area of the barrel portion 52 located below the horizontal plane 68.

The inner surface 58 in the upper portion 64 is unbroken and does not include windows or other openings in order to fully capture hydraulic fluid. However, the barrel portion 52 includes a plurality of openings or windows including a first opening 70, a second opening 72, and a third opening 74. The openings 70, 72, and 74 are all located in the lower portion 66 of the barrel portion 52 and extend from the inner surface 58 to the outer surface 60. The first opening 70 is larger than the second and third openings 72 and 74 and is located between the second and third openings 72 and 74. It should be appreciated that other opening configurations of openings may be employed with the present disclosure, for example, a plurality of drain holes, without departing from the scope of the present disclosure. The openings 70, 72, and 74 are configured along the inner circumference of the inner surface 58 such that the openings 70, 72, and 74 align with the plurality of case drain holes 26 in the transmission case 12 shown in FIG. 1 when the baffle 50 is secured to the transmission case 12.

The baffle 50 further includes a plurality of tab members 76 located on the outer surface 60 proximate the first end 54. The tab members 76 are arranged along a portion of the outer circumference of the outer surface 60 and extend at least partially radially outward and axially towards the second end 56. The tab members 76 are sized to fit between adjacent bolt hole bosses 24 on the transmission case 12, as shown in FIG. 1. The tab members 76 have a triangular shape in the example provided, however it should be appreciated that the tab members 76 may have various other shapes without departing from the scope of the present disclosure so long as the tab members fit between the plurality of bolt hole bosses 24 on the transmission case 12 (FIG. 1). The tab members 76 are operable to secure the baffle 50 to the transmission case 12 and to prevent rotation of the baffle 50 relative to the transmission case 12.

The baffle 50 is preferably made from a polymer. An exemplary polymer includes polyamide (nylon) 66. The baffle 50 is preferably made using injection molding having a two die pull.

Returning to FIG. 1, the baffle 50 is disposed between the transmission case 12 and the largest rotating component within the gear train section 16. More specifically, the baffle 50 encircles the rotating component 30 such that the rotating component 30 is disposed within the cavity 62 of the baffle 50. The tab members 76 each fit between adjacent bolt hole bosses 24 of the transmission case 12. Moreover, the bottom portion 66 of the baffle 50 is oriented such that the bottom portion 66 is adjacent the sump section 14 of the transmission 10 and the openings 70, 72, and 74 align with the plurality of case drain holes 26 in the transmission case 12.

As the rotating component 30 rotates, hydraulic fluid on internal components within the rotating component 30, such as gear sets, rotating clutches and brakes, and shafts, is propelled outward due to centrifugal force. The hydraulic fluid collects on the inner surface 58 of the baffle 50. Gravity then forces the hydraulic fluid to move down the baffle 50 into the bottom portion 66. There, the hydraulic fluid exits the baffle 50 through the openings 70, 72, and 74 and communicates with the sump section 14 via the cut segments 28 in the transmission case 12. By collecting the hydraulic fluid in the baffle 50, hydraulic fluid uncontrollably splashing other rotating components and the sump section 14 is minimized.

The description of the disclosure is merely exemplary in nature and variations that do not depart from the gist of the disclosure are intended to be within the scope of the disclosure. Such variations are not to be regarded as a departure from the spirit and scope of the disclosure.

The invention claimed is:

1. A transmission comprising:
   a transmission case;
   a rotatable component disposed within the transmission case;
   a sump disposed adjacent the rotatable component for storing a hydraulic fluid; and
   a baffle disposed between the rotatable component and the transmission case, the baffle comprising:
      an outer surface;
      an inner surface defining a cavity and wherein the inner surface encircles the rotatable component disposed within the cavity;
      a plurality of tabs disposed radially outward from the outer surface, the plurality of tabs in contact with the transmission case to prevent the baffle from rotating relative to the transmission case; and
      a plurality of openings located at a bottom portion of the baffle, the plurality of openings extending through the baffle between the inner surface and the outer surface,
   wherein the hydraulic fluid discharged from the rotatable component collects on the inner surface of the baffle and is directed out of the cavity through the plurality of openings and into the sump.

2. The transmission of claim 1 wherein the baffle includes a front end and a back end disposed axially opposite the front end, and wherein the plurality of tabs are located proximate the front end.

3. The transmission of claim 1 wherein the plurality of openings include three openings, and wherein a first of the three openings is larger than a second and third of the three openings.

4. The transmission of claim 3 wherein the first opening is located between the second and third openings and is disposed axially along the bottom portion of the baffle.

5. The transmission of claim 1 wherein the transmission case includes a lower wall having a plurality of case drain holes that communicate with the sump, and wherein the plurality of openings in the baffle are in communication with the case drain holes of the lower wall.

6. The transmission of claim 1 wherein the inner surface of the baffle is solid along a top portion of the baffle in order to collect the hydraulic fluid and prevent the hydraulic fluid from exiting the baffle via the top portion.

7. The transmission of claim 1 wherein the transmission case includes a plurality of bolt hole bosses, and the plurality of tabs of the baffle are disposed between the plurality of bolt hole bosses.

8. The transmission of claim 1 wherein the rotating component is a rotating shell surrounding at least one of a gear set, shaft, or torque transmitting device, the rotating shell having a plurality of slots that allow for communication of the hydraulic fluid therethrough.

9. The transmission of claim 1 wherein the transmission case includes a front end located proximate a hydrodynamic fluid drive device and the baffle is located proximate the front end of the transmission case.

10. The transmission of claim 1 wherein the baffle is directly radially adjacent the transmission case and the rotating component with no components between the baffle and the rotating component and the baffle and the transmission case.

11. The transmission of claim 1 wherein the baffle is disposed radially outward of a largest rotating component within the transmission.

12. A transmission comprising:
   a transmission case having a plurality of features and a plurality of windows;
   a rotatable component disposed within the transmission case;
   a sump disposed below the rotatable component for storing a hydraulic fluid, the sump in communication with the plurality of windows of the transmission case;
   a baffle disposed between the rotatable component and the transmission case, the baffle having:
      an outer surface;
      an inner surface defining a cavity wherein the inner surface encircles the rotatable component;
      a first end;
      a second end located axially opposite the first end;
      a plurality of tabs disposed radially outward from the outer surface and disposed proximate the first end, wherein the plurality of tabs are disposed between the plurality of features of the transmission case to prevent the baffle from rotating relative to the transmission case; and
      a plurality of openings located at a bottom portion of the baffle, the plurality of openings in communication with the plurality of windows of the transmission case; and
   wherein the hydraulic fluid from the rotatable component collects on the inner surface of the baffle and is directed out of the cavity through the plurality of openings, through the plurality of windows in the transmission case, and into the sump.

13. The transmission of claim 12 wherein the plurality of openings include three openings, and wherein a first of the three openings is larger than a second and third of the three openings.

14. The transmission of claim 13 wherein the first opening is located between the second and third openings and is disposed axially along the bottom portion of the baffle.

15. The transmission of claim 12 wherein the inner surface of the baffle is solid along a top portion of the baffle in order to collect the hydraulic fluid and prevent the hydraulic fluid from exiting the baffle via the top portion.

16. The transmission of claim 12 wherein the rotating component is a rotating shell surrounding at least one of a gear set, shaft, or torque transmitting device, the rotating shell having a plurality of slots that allow for communication of the hydraulic fluid therethrough.

17. The transmission of claim 16 wherein the rotating shell is interconnected to a carrier member of a planetary gear set.

18. The transmission of claim 12 wherein the transmission case includes a front end located proximate a hydrodynamic fluid drive device and the baffle is located proximate the front end of the transmission case.

19. The transmission of claim 12 wherein the baffle is directly radially adjacent the transmission case and the rotating component with no components between the baffle and the rotating component and the baffle and the transmission case.

20. The transmission of claim 12 wherein the rotating component is radially the largest rotating component within the transmission.

21. The transmission of claim 12 wherein the plurality of features on the transmission case are bolt hole bosses.

* * * * *